(12) United States Patent
Itou

(10) Patent No.: US 10,046,391 B2
(45) Date of Patent: Aug. 14, 2018

(54) DIE APPARATUS

(71) Applicant: KOBAYASHI INDUSTRY CO., LTD., Yurihonjo, Akita (JP)

(72) Inventor: Kiyomitsu Itou, Akita (JP)

(73) Assignee: KOBAYASHI INDUSTRY CO., LTD., Yurihonjo (JP)

( * ) Notice: Subject to any disclaimer, the term of this patent is extended or adjusted under 35 U.S.C. 154(b) by 361 days.

(21) Appl. No.: 14/891,509

(22) PCT Filed: Jun. 24, 2015

(86) PCT No.: PCT/JP2015/068202
§ 371 (c)(1),
(2) Date: Nov. 16, 2015

(87) PCT Pub. No.: WO2015/194681
PCT Pub. Date: Dec. 23, 2015

(65) Prior Publication Data
US 2016/0214172 A1    Jul. 28, 2016

(30) Foreign Application Priority Data
Jan. 16, 2015  (JP) .................................. 2015-007257

(51) Int. Cl.
*B29C 43/56* (2006.01)
*B22F 3/03* (2006.01)
(Continued)

(52) U.S. Cl.
CPC ................ *B22F 3/03* (2013.01); *B28B 7/386* (2013.01); *B29C 43/32* (2013.01); *B30B 11/007* (2013.01);
(Continued)

(58) Field of Classification Search
CPC ......... B22F 3/03; B30B 15/022; B28B 7/386; B29C 43/106; B29C 43/32
(Continued)

(56) References Cited

U.S. PATENT DOCUMENTS

2002/0025271 A1* 2/2002 Goransson ................ B22F 3/03
                                                               425/352
2013/0039798 A1* 2/2013 Satran ....................... B22F 3/03
                                                                425/78

FOREIGN PATENT DOCUMENTS

JP    06-238500    8/1994
JP    10-094899    4/1998
(Continued)

OTHER PUBLICATIONS

International Search Report dated Sep. 15, 2015, Application No. PCT/JP2015/068202.
European Search Report dated Apr. 26, 2017, 6 pages.

*Primary Examiner* — Joseph S Del Sole
*Assistant Examiner* — Thu Khanh T Nguyen
(74) *Attorney, Agent, or Firm* — Rankin, Hill & Clark LLP

(57) ABSTRACT

A die apparatus capable of removing powder adhering to cut surfaces so as to securely form a cavity in a desired shape includes divided dies reciprocatingly driven by sliders to comes into contact with one another so as to form a cavity. Punches are inserted into the cavity from above and below the cavity. Each divided die is provided with cut surfaces that come into contact with the other divided dies. A gas passage connected to a gas injection port that injects gas from the cut surface is formed in each divided die.

4 Claims, 2 Drawing Sheets

(51) Int. Cl.
 *B29C 43/32* (2006.01)
 *B28B 7/38* (2006.01)
 *B30B 15/02* (2006.01)
 *B30B 11/00* (2006.01)
 *B30B 15/00* (2006.01)

(52) U.S. Cl.
 CPC ........ *B30B 15/0082* (2013.01); *B30B 15/022* (2013.01); *B29C 2043/3233* (2013.01)

(58) Field of Classification Search
 USPC .......................................... 425/78, 352–355
 See application file for complete search history.

(56) References Cited

FOREIGN PATENT DOCUMENTS

| | | |
|---|---|---|
| JP | 2000-135598 | 5/2000 |
| JP | 2009-120953 | 6/2009 |
| WO | 2015/120496 | 8/2015 |

* cited by examiner

DIE APPARATUS

TECHNICAL FIELD

The present invention relates to a die apparatus for use in powder compaction of metals, ceramics, or the like.

BACKGROUND ART

As a conventional die apparatus for use in powder compaction of metal, ceramics, or the like, an apparatus including a die having a cavity and upper and lower punches respectively inserted into the cavity from above and below of the cavity is used. In the die apparatus, the cavity of the die is filled with powder of metal, ceramics, or the like, and the powder is compacted by the punches inserted into the cavity from above and below of the die so as to compact the powder.

In this case, depending on the shape of the powder compact to be formed, the die may be divided into two or more. Each of the divided dies has cut surfaces extending along a moving direction of the punches, and is reciprocatingly movable in a direction of forming the cavity.

For example, if the die is divided into three, each of the dies is moved forward in the direction of the cavity from three directions, and each die comes into contact with the adjacent dies on the cut surfaces thereof so as to close the dies, thereby forming the cavity (see Patent Literature 1, for example).

In the apparatus described in Patent Literature 1, powder of metal, ceramics, or the like in the cavity filled from a powder supply apparatus disposed above the cavity is compacted by upper and lower punches into a powder compact, and thereafter, each die is moved backward so as to release the powder compact from the dies.

CITATION LIST

Patent Literature

Patent Literature 1: Japanese Patent Laid-Open No. H10-94899

SUMMARY OF INVENTION

Technical Problem

However, the aforementioned conventional die apparatus has the following inconvenience: when the dies are moved backward after forming the powder compact, some powder drops from the powder supply apparatus, or the powder intrudes into a gap between the cut surfaces in contact with each other if the dies have abrasion, so that the powder adheres to the cut surfaces in some cases. Powder adhering to the cut surfaces hinders tight contact between the cut surfaces when the dies are moved forward to produce a next powder compact, which makes it difficult to form a cavity having a desired shape in some cases.

An object of the present invention is to provide a die apparatus capable of solving the aforementioned inconvenience, by removing powder adhering to cut surfaces so as to securely form a cavity having a desired shape.

Solution to Problem

The present invention is directed to a die apparatus including: a plurality of divided dies configured to come into contact with one another on cut surfaces thereof so as to form a cavity; a plurality of sliders configured to reciprocatingly drive each of the plurality of divided dies; and an upper punch and a lower punch that are inserted into the cavity from above and below of the cavity.

In the die apparatus of the present invention, among a pair or each pair of divided dies that are included in the plurality of divided dies and come into contact with each other on the cut surfaces thereof, at least one divided die is provided with a gas passage configured to inject gas through a gas injection port disposed in each cut surface.

According to the die apparatus of the present invention, in a state in which the pair of divided dies are close to each other, the gas is injected from the gas injection port through the gas passage formed in at least one of the divided dies of the pair of divided dies, thereby generating an air flow in a gap between the pair of divided dies. The flow rate of the air flow increases as the gap between the pair of divided dies becomes narrow, and thus the powder adhering to the cut surfaces of the pair of divided dies that oppose each other can be blown off and removed. As a result, it is possible to bring the cut surfaces of the pair of divided dies into contact with each other with no powder in the gap between the pair of divided dies, thus securely forming the cavity having a desired shape.

In the die apparatus of the present invention, preferably, when each cut surface of one divided die of the pair or each pair of divided dies is brought into contact with each cut surface of the other divided die, the gas passage of the one divided die and the gas passage of the other divided die are configured such that a position of the gas injection port in each cut surface of the one divided die deviates from a position of the gas injection port in each cut surface of the other divided die.

According to the above configured die apparatus, it is possible to prevent the gas injected from each of the gas injection ports of the one divided die and the other divided die from colliding and interfering with each other. As a result, the gas injected from each of the gas injection ports of the one divided die and the other divided die can separately generate an air flow in the gap between the two divided dies, thereby efficiently removing the powder present in the gap.

In the die apparatus of the present invention, preferably, a groove is formed in each cut surface of the at least one divided die in such a manner that the groove is continued to the gas injection port, and at least a part of the groove extends in a vertical direction.

In the above configured die apparatus, the air flow can be readily guided in a wide range in the vertical direction in the gap between the pair of divided dies whose cut surfaces closely oppose each other, thus efficiently removing the powder present in the gap.

In the die apparatus of the present invention, preferably, at least one slider of the plurality of sliders is provided with an auxiliary gas passage that is connected to a gas supply apparatus through a gas introduction port and also communicate with the gas passage of the at least one divided die.

According to the above configured die apparatus, the gas supplied from the gas supply apparatus through the gas introduction port into the auxiliary gas passages formed in the slider is guided from the air injection port through the air passage formed in the divided die communicating with the auxiliary gas passage, into the gap between the divided die and the other divided die that closely oppose each other.

DESCRIPTION OF EMBODIMENTS

Figure 1:
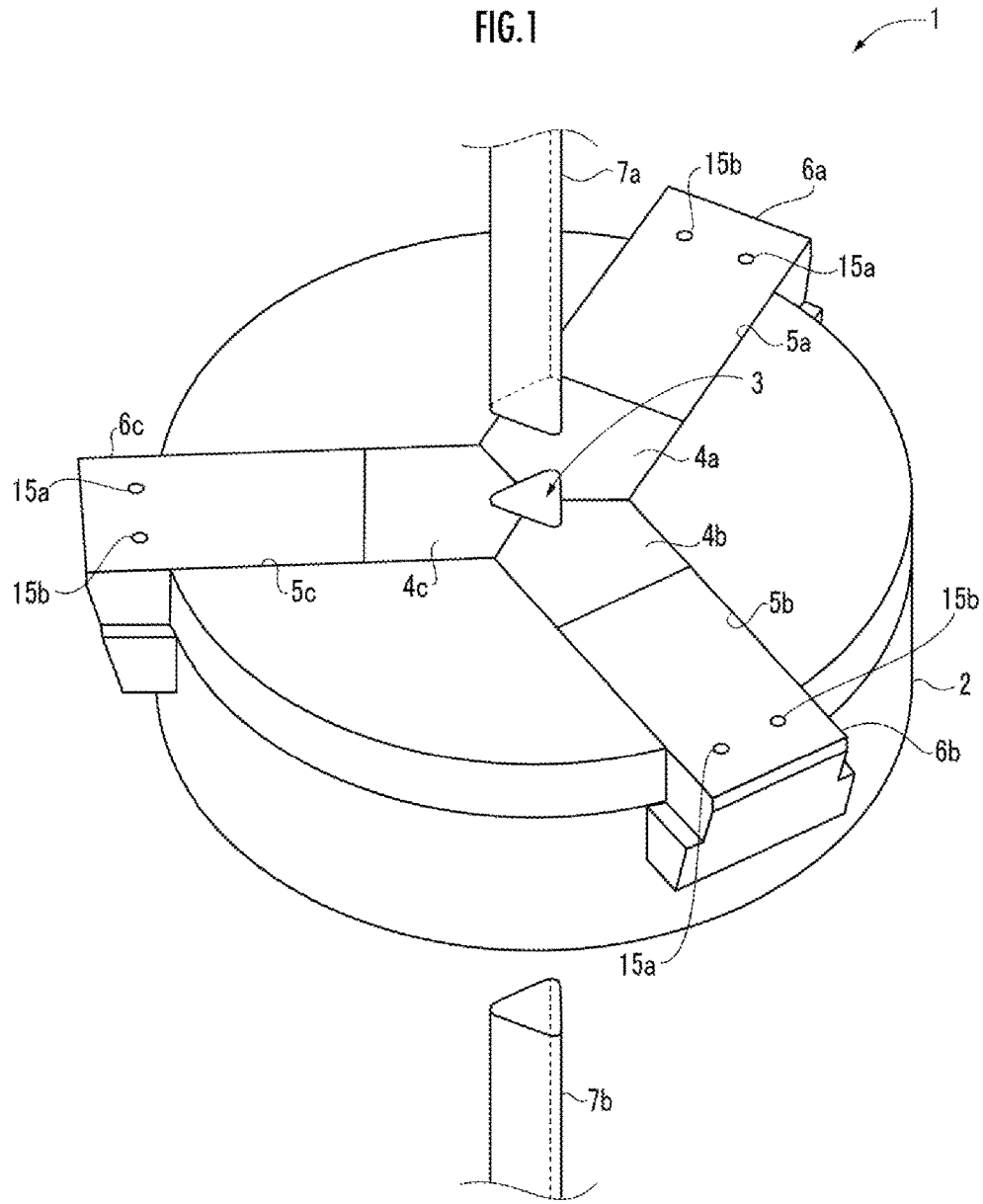
FIG. 1 is a schematic perspective view of a die apparatus as one embodiment of the present invention.

As shown in FIG. 1, a die apparatus 1 as one embodiment of the present invention includes a die base 2 formed of a donut-shaped disk having a through-hole 17 (see FIG. 2 and FIG. 3) at a center thereof, and three divided dies 4a, 4b, 4c that come into contact with one another to form a cavity 3. The die base 2 includes guide grooves 5a, 5b, 5c radially extending from the through-hole 17 with equal intervals, and the divided dies 4a, 4b, 4c are driven by respective sliders 6a, 6b, 6c coupled to corresponding rear ends (on an opposite side to the cavity 3) of the divided dies 4a, 4b, 4c so as to be reciprocatingly movable along the guide grooves 5a, 5b, 5c.

For simple expression of three reference numerals "a", "b", and "c", representations "i", "i+", and "i−" are appropriately used. The representation "i+" denotes "b" in the case of i=a, denotes "c" in the case of i=b, and denotes "a" in the case of i=c. The representation "i−" denotes "c" in the case of i=a, denotes "a" in the case of "i=b", and denotes "b" in the case of i=c.

Each divided die 4i is moved forward by each slider 6i so that the divided die 4i and the other divided dies 4i+ and 4i− mutually come into contact with one another on respective cut surfaces 11a, 11b of the divided die 4i, thereby forming the cavity 3 by the divided dies 4a, 4b, 4c at the through-hole 17 located at the center of the die base 2. The die apparatus 1 is provided with an upper punch 7a inserted into the cavity 3 from above of the cavity 3, a lower punch 7b inserted into the cavity 3 from below of the cavity 3, and a powder supply apparatus (not shown) to supply powder of metal, ceramics, or the like into the cavity 3.

According to the above configured die apparatus 1, the cavity 3 is formed by the divided die 4i driven by the slider 6i, and the lower punch 7b is inserted into the cavity 3. Subsequently, in this state, powder supplied from the powder supply apparatus is filled into the cavity 3, and the powder filled in the cavity 3 is compacted by the upper punch 7a and the lower punch 7b so as to produce a powder compact. The divided die 4i is driven backward by the slider 6i as to open the dies, the upper punch 7a is detached from the cavity 3, and the powder compact is knocked out to be ejected by the lower punch 7b.

When the powder filled in the cavity 3 is compacted by the upper punch 7a and the lower punch 7b, and if at least one of the cut surfaces 11a and 11b of the divided die 4i has a gap due to abrasion, the powder might intrude into the gap, and adhere to the cut surfaces. Also, when the dies are opened (when each divided die 4i is driven backward), the powder supplied from the powder supply apparatus may drop and adhere to the cut surfaces. If the powder remains adhered to the cut surfaces, the divided dies 4a, 4b, 4c cannot come into contact with one another on the cut surfaces thereof, thus hindering formation of the cavity in a desired shape in some cases.

Figure 2:
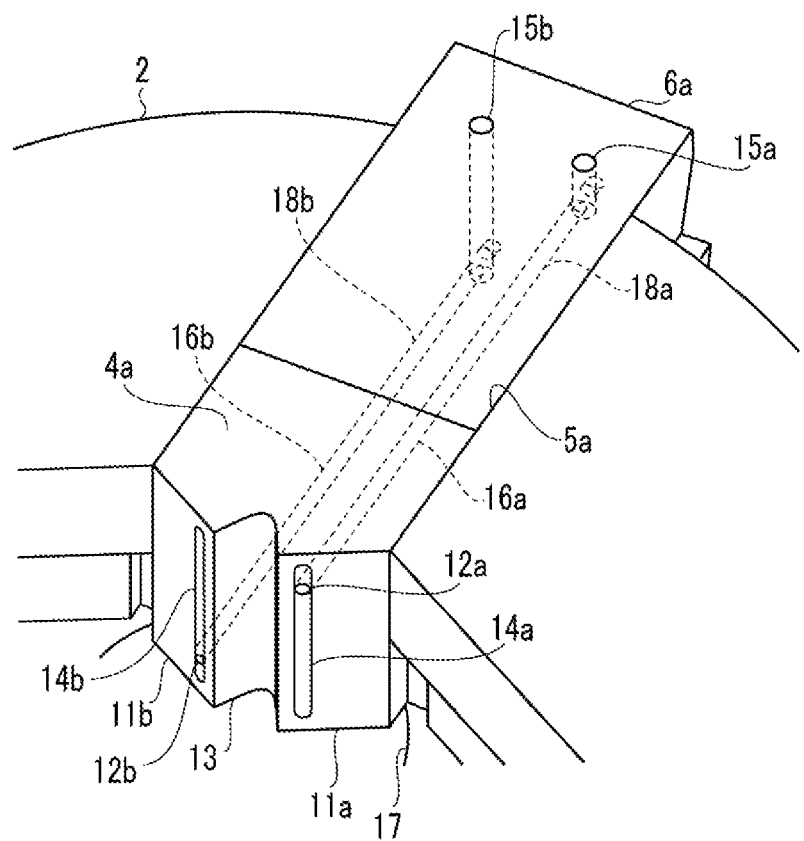
FIG. 2 is a schematic perspective view of each divided die and each slider included in the die apparatus as one embodiment of the present invention.

To counter this, as shown in FIG. 2, the cut surfaces 11a, 11b to come into contact with the other pair of divided dies 4b and 4c are formed at a front end of the divided die 4a. For simple expression of two reference numerals "a" and "b", a representation "j" is appropriately used. Each cut surface 11j extends in a moving direction of the upper punch 7a and the lower punch 7b, that is, in the vertical direction. A gas passage 16j is formed in the divided die 4a in a manner as to inject gas (gas or air) from the cut surface 11j through a gas injection port 12j. A recess 13 that is recessed backward is formed between the cut surfaces 11a and 11b of the divided die 4a.

The gas injection port 12a is located at an upper position from the center of the cut surface 11a on one side, and the gas injection port 12b is located at a lower position from the center of the cut surface 11b on the other side. A groove 14j to guide the gas injected from the gas injection port 12j in the vertical direction of each cut surface 11j is formed in each cut surface 11j. The gas injection port 12j opens in a manner as to be continued to the groove 14j (a bottom, for example).

In the slider 6a, there are formed forwardly extending auxiliary gas passages 18j continued from corresponding gas introduction ports 15j located at a rear position in the slider 6a. Each auxiliary gas passage 18j is configured to communicate with the corresponding gas passage 16j formed in the divided die 4a in a state in which the front end of the slider 6a and the rear end of the divided die 4a are in contact with each other. The gas supplied from a gas supply apparatus connected to each gas introduction port 15j via a conduit or the like is injected from each gas injection port 12j through each auxiliary gas passage 18j and each gas passage 16j.

An example of the gas may include an inert gas, such as carbon dioxide and nitrogen, or compressed air. An example of the gas supply apparatus may include a carbon dioxide cylinder, a nitrogen cylinder, or the like if the gas is an inert gas; and a compressed air cylinder, an air compressor, or the like if the gas is compressed air.

Not shown in FIG. 2, the other sets between the divided die 4b and the slider 6b, and between the divided die 4c and the slider 6c have the same configurations as that of the divided die 4a and the slider 6a.

(Function)

Figure 3:
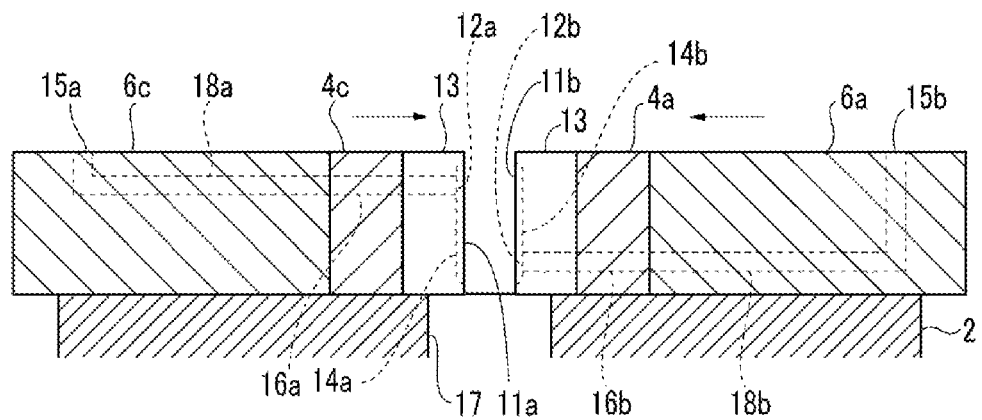
FIG. 3 is a schematic sectional view of the die apparatus in a state in which each divided die and each slider are moved forward as one embodiment of the present invention.

According to the above configured die apparatus 1, subsequent to producing and releasing the current powder compact from the dies, when a subsequent powder compact is produced, each divided die 4i are driven forward by each slider 6i. By this, as shown in FIG. 3, the cut surface 11b of one divided die 4i (i=a in FIG. 3) and the cut surface 11a of the other divided die 4i− (i−=c in FIG. 3) are gradually coming closer to each other. At this time, the gas is injected from the cut surface 11b of the divided die 4a through the gas injection port 12b, and the gas is also injected from the cut surface 11a of the divided die 4c through the gas injection port 12a. Each injection port 12j has a diameter within a range of 0.2 to 1.0 [mm], for example. As the gas, for example, compressed air at a pressure of 0.5 to 1.0 [MPa] produced in facility of a plant is used after being subjected to flow regulation with a throttle valve.

After being injected from each of the gas injection ports 12a and 12b, the gas generates an air flow flowing along each of one cut surface 11a and the other cut surface 11b that oppose each other. In one divided die 4a, the gas injection port 12a is located at an upper position of the cut surface 11a, and in the other divided die 4c, the gas injection port 12b is located at a lower position of the cut surface 11b; thus there is a difference in height therebetween. Accordingly, the gas injected from each of the gas injection ports 12a and 12b can separately generate an air flow without colliding and interfering with each other. The gas is guided by the respective grooves 14a and 14b in the vertical direction, thus generating the air flow spreading in a wide range in the vertical direction in the gap between the cut surfaces 11a and 11b that oppose each other.

As the cut surface 11b of one divided die 4a and the cut surface 11a of the other divided die 4c are gradually coming closer to each other, the gap between the cut surfaces 11a and 11b becomes decreased, so that a flow rate of the air flow is increased, thus blowing off and removing the powder adhering to the cut surfaces 11a and 11b. Decrease in gap between the cut surfaces 11a and 11b that oppose each other allows the grooves 14a and 14b to more effectively exert their effects, thus readily blowing off and removing the powder.

Accordingly, when the divided dies 4a, 4c are further moved forward, and the cut surfaces 11a and 11b come into contact with each other, the powder adhering to the cut surfaces 11a and 11b is removed; therefore, it is possible to form the cavity 3 in a desired shape.

ANOTHER EMBODIMENT OF THE PRESENT INVENTION

In addition to the case of providing the pair of cut surfaces 11a and 11b that oppose each other with the respective gas injection ports 12a and 12b, only one of the cut surfaces 11a and 11b in pair may be provided with the gas injection port 12a or the gas injection port 12b.

The gas passage 16a or 16b formed in the divided die 4i may be modified to extend in various manners. For example, in one of the cut surfaces 11a, 11b of the divided die 4i, the gas passage 16a or the gas passage 16b may be formed in a manner as to be connected to (not a singularity of, but) a plurality of gas injection ports 12a or gas injection ports 12b. The gas passage 16a or 16b may be formed to obliquely (not in parallel) extend relative to an axial direction of each divided die 4i in a top view or in a side view.

In FIG. 3, the operation between the divided die 4a and the slider 6a, and the divided die 4c and the slider 6c is exemplified, but in the die apparatus 1, the same operation is also performed between the divided die 4b and the slider 6b, and the divided die 4a and the slider 6a, and between the divided die 4c and the slider 6c, and the divided die 4b and the slider 6b.

The gas injection port 12a and the gas injection port 12b respectively formed in the cut surface 11a and the cut surface 11b that oppose each other may be arranged at the same height. According to this configuration, it is possible to cause the gas injected from the gas injection port 12a and the gas injected from the gas injection port 12b toward the gap between one divided die 4i and the other divided die 4i− (or 4i+) to interfere with each other.

In the present embodiment, the cavity 3 is formed by the three divided dies 4a to 4c, but as another embodiment, the cavity may be formed by a plurality of divided dies, specifically, two divided dies, or four or more divided dies.

REFERENCE SIGNS LIST

1 . . . die apparatus; 3 . . . cavity; 4a, 4b, 4c . . . divided die; 6a, 6b, 6c . . . slider; 7a . . . upper punch; 7b . . . lower punch; 11a, 11b . . . cut surface; 12a, 12b . . . gas injection ports; 14a, 14b . . . groove; 15a, 15b . . . gas introduction port; 16a, 16b . . . gas passage; 18a, 18b . . . auxiliary gas passage

The invention claimed is:

1. A die apparatus comprising:
a plurality of divided dies configured to come into contact with one another on cut surfaces thereof so as to form a cavity;
a plurality of sliders configured to reciprocatingly drive each of the plurality of divided dies; and
an upper punch and a lower punch that are inserted into the cavity from above and below of the cavity,
wherein
among a pair or each pair of divided dies that are included in the plurality of divided dies and come into contact with each other on the cut surfaces thereof, at least one divided die is provided with a gas passage configured to inject gas through a gas injection port disposed in each cut surface, and
the gas injection port is provided to be closed when said pair or each pair of divided dies come into contact with each other on the cut surfaces thereof.

2. The die apparatus according to claim 1, wherein
when each cut surface of one divided die of the pair or each pair of divided dies is brought into contact with each cut surface of the other divided die, the gas passage of the one divided die and the gas passage of the other divided die are configured such that a position of the gas injection port in each cut surface of the one divided die deviates from a position of the gas injection port in each cut surface of the other divided die.

3. The die apparatus according to claim 1, wherein
a groove is formed in each cut surface of the at least one divided die in such a manner that the groove is continued to the gas injection port, and at least a part of the groove extends in a vertical direction.

4. The die apparatus according to claim 1, wherein
at least one slider of the plurality of sliders is provided with an auxiliary gas passage that is connected to a gas supply apparatus through a gas introduction port and also communicate with the gas passage of the at least one divided die.

* * * * *